United States Patent
Duan et al.

(10) Patent No.: US 12,162,771 B2
(45) Date of Patent: Dec. 10, 2024

(54) GAS NOZZLE, GAS REACTION DEVICE AND GAS HYDROLYSIS REACTION METHOD

(71) Applicants: GUANGZHOU HUIFU RESEARCH INSTITUTE CO., LTD., Guangdong (CN); HUBEI HUIFU NANOMATERIAL CO., LTD., Hubei (CN)

(72) Inventors: Xianjian Duan, Guangzhou (CN); Yuelin Wang, Guangzhou (CN); Chenggang Wang, Guangzhou (CN); Chunlei Wu, Guangzhou (CN); Zhengfa Li, Guangzhou (CN)

(73) Assignees: GUANGZHOU HUIFU RESEARCH INSTITUTE CO., LTD., Guangdong (CN); HUBEI HUIFU NANOMATERIAL CO., LTD., Hubei (CN)

( * ) Notice: Subject to any disclaimer, the term of this patent is extended or adjusted under 35 U.S.C. 154(b) by 558 days.

(21) Appl. No.: 17/429,890

(22) PCT Filed: Oct. 31, 2019

(86) PCT No.: PCT/CN2019/114853
§ 371 (c)(1),
(2) Date: Aug. 10, 2021

(87) PCT Pub. No.: WO2020/238009
PCT Pub. Date: Dec. 3, 2020

(65) Prior Publication Data
US 2022/0204341 A1    Jun. 30, 2022

(30) Foreign Application Priority Data
May 31, 2019  (CN) .......................... 201910466940.2

(51) Int. Cl.
*B01J 8/00* (2006.01)
*C01B 7/19* (2006.01)
*C01B 33/12* (2006.01)

(52) U.S. Cl.
CPC ............... *C01B 7/193* (2013.01); *B01J 8/004* (2013.01); *B01J 8/0055* (2013.01); *C01B 33/12* (2013.01);
(Continued)

(58) Field of Classification Search
None
See application file for complete search history.

(56) References Cited

U.S. PATENT DOCUMENTS

| 1,462,395 A * | 7/1923 | Thompson | F23D 11/103 239/431 |
|---|---|---|---|
| 2008/0134838 A1 | 6/2008 | Memoli et al. | |
| 2011/0162379 A1 | 7/2011 | Baruah et al. | |

FOREIGN PATENT DOCUMENTS

| CN | 1422805 | 6/2003 |
|---|---|---|
| CN | 1222472 C | 10/2005 |

(Continued)

OTHER PUBLICATIONS

Machine Translation of Liu (Year: 2023).*
(Continued)

*Primary Examiner* — Michael Forrest
(74) *Attorney, Agent, or Firm* — HSML P.C.

(57) ABSTRACT

A gas nozzle (100), a gas reaction device (10) and a gas hydrolysis reaction method. A plurality of fuel gas channels (116) are provided on a side wall of a nozzle cavity (110) of the gas nozzle (100); the plurality of fuel gas channels (116) are arranged around the side wall of the nozzle cavity (110); a mixed gas introduced from a nozzle inlet (112) is surrounded by a fuel gas (21) introduced from the plurality of (Continued)

fuel gas channels (116); and the fuel gas channels (116) are inclined towards a nozzle outlet (114), and the fuel gas channels (116) are further inclined in the same clockwise direction. In this way, the fuel gas (21) introduced from the plurality of fuel gas channels (116) forms a downwardly conical spiral flame, and a flame formed by the mixed gas introduced from the nozzle inlet (112) is wrapped therein and sprayed out from the nozzle outlet (114).

12 Claims, 5 Drawing Sheets

(52) U.S. Cl.
CPC .............. *B01J 2208/00212* (2013.01); *B01J 2208/00504* (2013.01)

(56) References Cited

FOREIGN PATENT DOCUMENTS

| | | | |
|---|---|---|---|
| CN | 1850599 A | * | 10/2006 |
| CN | 1858498 | | 11/2006 |
| CN | 100369811 C | | 2/2008 |
| CN | 101120210 | | 2/2008 |
| CN | 101734668 | | 6/2010 |
| CN | 201672512 U | | 12/2010 |
| CN | 102167334 | | 8/2011 |
| CN | 203615346 U | | 5/2014 |
| CN | 204739592 U | | 11/2015 |
| CN | 107583594 A | * | 1/2018 |
| CN | 108101001 | | 6/2018 |
| CN | 110354795 | | 10/2019 |
| GB | 2005565 | | 4/1979 |
| JP | 2011141112 | | 7/2011 |
| WO | 2006129908 | | 12/2006 |

OTHER PUBLICATIONS

Machine Translation of Tian (Year: 2023).*
International Search Report issued for International Patent Application No. PCT/CN2019/114853, Date of mailing: Mar. 2, 2020, 6 pages including English translation.
Office Action issued for Chinese Patent Application No. 201910466940. 2, dated Apr. 23, 2020, 19 pages including English translation.
Supplementary Search Report issued for Chinese Patent Application No. 201910466940.2, Mailing Date: Sep. 27, 2020, 1 page.
Extended European Search Report issued for European Patent Application No. 19931394.1, dated Jan. 27, 2022, 10 pages.

* cited by examiner

GAS NOZZLE, GAS REACTION DEVICE AND GAS HYDROLYSIS REACTION METHOD

TECHNICAL FIELD

The present disclosure relates to the field of gas reaction, and in particular, to a gas nozzle, a gas reaction device and a method for gas hydrolysis reaction.

BACKGROUND

Fluorine is an important resource and has an important position in industry. Hydrogen fluoride is the first fluorine chemical product, and can be used to prepare a series of products, such as fluoroplastics, fluororubbers, inorganic fluorides, and refrigerants, etc. The fluorine resources that can be used in nature mainly exist in the form of fluorite ($CaF_2$), cryolite ($Na_3(AlF_6)$) and fluorapatite ($Ca_{10}(PO_4)_6F_2$). However, the reserves of cryolite and fluorite in the earth's crust are limited, and the fluorite, as a non-renewable strategic resource, has been protected by various countries and restricted from mining. 90% of the world's fluorine resources are contained in rock phosphate in an associated state. Although the content of fluorine in rock phosphate is only 3%-4%, it is a huge reserve and is a very important fluorine resource.

The fluorine-containing by-products in the phosphorus chemical industry are mainly fluorosilicic acid or fluorosilicate. In addition, there are also a large amount of fluorosilicic acid and silicon tetrafluoride in the tailing treatment after extraction from molybdenum ore. For the utilization of the above-mentioned fluorine-containing by-products, the focus is on the extraction and utilization of fluorine resources, but silicon with a higher content therein has not been used, which has not achieved the maximum benefit. Therefore, it is necessary to comprehensively utilize the above-mentioned fluorine-containing by-products, and to extract and utilize the fluorine resources and silicon resources at the same time.

The gas phase process (also known as the pyrolysis process) is a process in which the reactants are reacted in a high-temperature flame and then undergo a series of post-treatment processes to obtain the final product. The most common fumed silica is obtained by high-temperature hydrolysis reaction ($SiCl_4+2H_2+O_2 \rightarrow SiO_2+4HCl$) in a hydrogen-oxygen flame with chlorosilane as raw material, but fumed silica prepared with silicon tetrafluoride as raw material is relatively few.

Since the reaction between silica and hydrofluoric acid ($SiO_2+HF \rightarrow SiF_4+H_2O$) is very easy to carry out at room temperature, the reverse reaction is difficult to occur. Therefore, under general high-temperature conditions, the yield of preparing silica and hydrogen fluoride is very low, and it is difficult to make full use of silicon tetrafluoride.

SUMMARY

Based on this, it is necessary to provide a gas nozzle, a gas reaction device and a method for gas hydrolysis reaction, to solve the problem of low yield of silica and hydrogen fluoride produced by silicon tetrafluoride in the traditional process and the difficulty of making full use of silicon tetrafluoride.

A gas nozzle, comprising a nozzle cavity, both ends of the nozzle cavity being provided with a nozzle inlet and a nozzle outlet, respectively, and a plurality of fuel gas channels being provided on a side wall of the nozzle cavity, a plurality of the fuel gas channels being arranged around the side wall of the nozzle cavity, each of the fuel gas channels being inclined towards the nozzle outlet, and each of the fuel gas channels being further inclined in the same clockwise direction.

In one embodiment, the nozzle cavity is a hollow barrel structure, and openings on the both ends of the nozzle cavity are the nozzle inlet and the nozzle outlet, respectively.

In one embodiment, a plurality of the fuel gas channels are equally distributed.

In one embodiment, 4 or more fuel gas channels are provided.

In one embodiment, a distance between the openings of two adjacent fuel gas channels is 2 mm to 300 mm.

In one embodiment, each of the fuel gas channels is inclined at an angle of 30° to 85° towards the nozzle outlet.

In one embodiment, each of the fuel gas channels is inclined at an angle of 30° to 85° towards an adjacent fuel gas channel.

In one embodiment, the gas nozzle further comprises a first jacket, the first jacket is sleeved on the nozzle cavity, a first venting cavity is formed between the first jacket and the nozzle cavity, each of the fuel gas channels is in communication with the first venting cavity, and the first jacket is provided with a first jacket inlet that is in communication with the first venting cavity.

A gas reaction device, comprising a gas supplier, a reaction chamber and the gas nozzle according to any one of the embodiments, wherein the gas supplier is in communication with the nozzle inlet of the gas nozzle, and the reaction chamber is in communication with the nozzle outlet of the gas nozzle.

In one embodiment, the gas supplier comprises a mixing cavity and a second jacket, the mixing cavity is provided with a mixing inlet and a mixing outlet that is in communication with the mixing inlet, the second jacket is sleeved on the mixing cavity, a second venting cavity is formed between the second jacket and the mixing cavity, and the second jacket is provided with a second jacket inlet and a second jacket outlet that are in communication with the second venting cavity, the second jacket outlet is arranged around the mixing outlet, and the second jacket outlet and the mixing outlet are each in communication with the nozzle inlet of the nozzle cavity.

In one embodiment, the gas reaction device further comprises a gas-solid separator that has a separation chamber, and a separation feed port, a separation gas outlet and a separation solid outlet that are in communication with the separation chamber, and the separation feed port is in communication with a discharge port of the reaction chamber.

In one embodiment, the gas reaction device further comprises a bag duster that has a dedusting chamber, and a dedusting feed port, a dedusting gas outlet, and a dedusting solid outlet that are in communication with the dedusting chamber, the dedusting feed port is in communication with the separation gas outlet of the gas-solid separator, and the dedusting solid outlet is in communication with the separation feed port of the gas-solid separator.

In one embodiment, the gas reaction device further comprises a deacidification apparatus that has a deacidification chamber and a deacidification feed port, a deacidification gas outlet and a deacidification solid outlet that are in communication with the deacidification chamber, and the deacidification feed port is in communication with the separation solid outlet of the gas-solid separator.

In one embodiment, the deacidification apparatus has multiple stages, a deacidification feed port of a subsequent stage deacidification apparatus is in communication with a deacidification solid outlet of a previous stage deacidification apparatus, and a deacidification feed port of a first-stage deacidification apparatus is in communication with the separation solid outlet of the gas-solid separator.

In one embodiment, the deacidification apparatus is further provided with a deacidification gas inlet that is communication with the deacidification chamber, a deacidification gas outlet of the subsequent stage deacidification apparatus is in communication with a deacidification gas inlet of the previous stage deacidification apparatus, and a deacidification gas outlet of the first-stage deacidification apparatus is in communication with the separation feed port of the gas-solid separator.

A method for gas hydrolysis reaction using the gas reaction device according to any one of the embodiments, comprising the following steps:

introducing a mixed gas of a raw material gas and a fuel gas into the nozzle cavity through the gas supplier and igniting the mixed gas to form a first flame; and introducing a fuel gas into the nozzle cavity through the fuel gas channel and igniting the fuel gas to form a second flame surrounding the first flame.

In one embodiment, the raw material gas comprises silicon tetrafluoride, and the fuel gas may produces water by combustion.

Compared with the current technical solution, the present disclosure has the following beneficial effects:

According to the above-mentioned gas nozzle, gas reaction device and method for gas hydrolysis reaction, the plurality of fuel gas channels are provided on the side wall of the nozzle cavity, the plurality of fuel gas channels are arranged around the side wall of the nozzle cavity, and the mixed gas introduced from the nozzle inlet is surrounded by the fuel gas introduced from the plurality of fuel gas channels. Each fuel gas channel is inclined towards the nozzle outlet and is further inclined in the same clockwise direction. In this way, the fuel gas introduced from the plurality of fuel gas channels forms a downwardly conical spiral flame, which wraps the flame formed by the mixed gas introduced from the nozzle inlet to spray out from the nozzle outlet. As such, on the one hand, it can be ensured that the temperature of the mixed gas entering the combustion zone is high enough to proceed the reaction. On the other hand, the fuel gas and the raw material gas can be further mixed to ensure sufficient reaction.

DETAILED DESCRIPTION OF THE EMBODIMENTS

For the convenience of understanding the present disclosure, the present disclosure is described more fully hereinafter with reference to the accompanying drawings. Preferable embodiments are presented in the drawings. However, the present disclosure may be embodied in many different forms and is not limited to the embodiments described herein. On the contrary, these embodiments are provided so as to make the understanding of the disclosure of the present disclosure more thorough and complete.

It should be understood that when an element is defined to be "arranged on" another element, it may be either directly arranged on an element or there may be an intermediate element between them. When an element is considered to be "connected" to another element, it may be directly connected to another element or there may be an intermediate element between them at the same time.

Unless otherwise defined, all technical and scientific terms used herein have the same meaning as commonly understood by skilled person in the art to which the present disclosure belongs. The terms used in the specification of the present disclosure herein are only for the purpose of describing specific embodiments and are not intended to limit the present disclosure. The term "and/or" used herein includes any and all combinations of one or more of the associated listed items.

Figure 1:
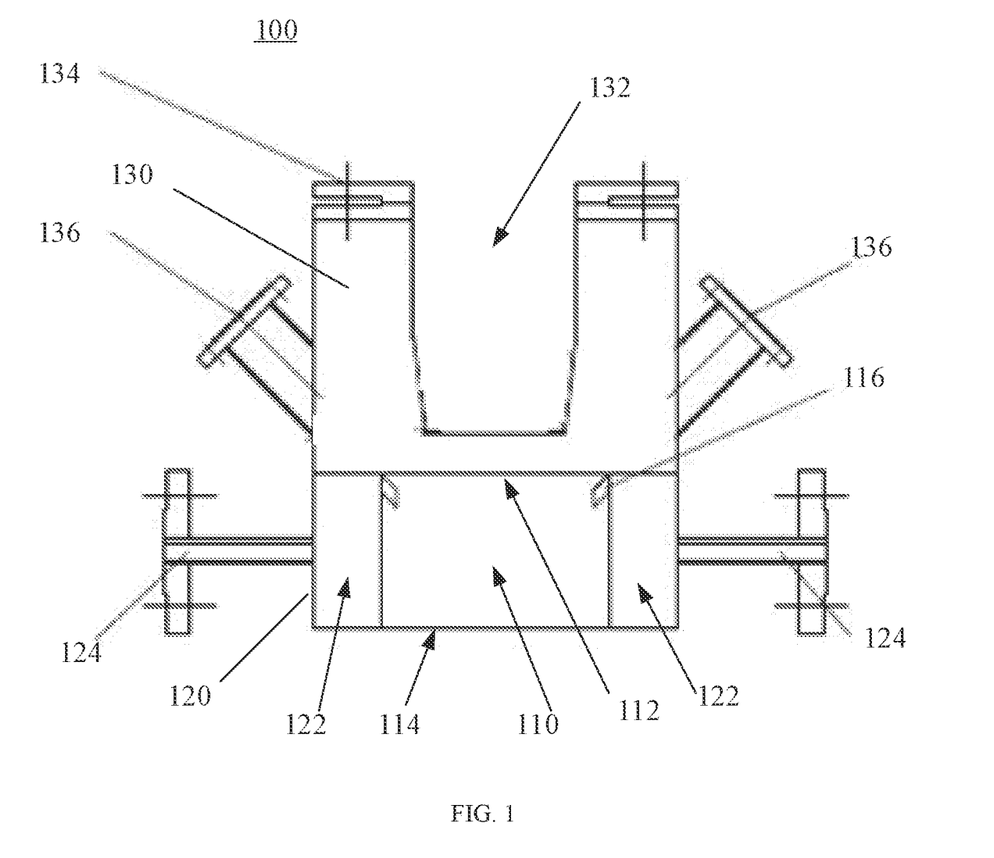
FIG. 1 is a structural schematic view of a gas nozzle according to an embodiment.
Figure 2:
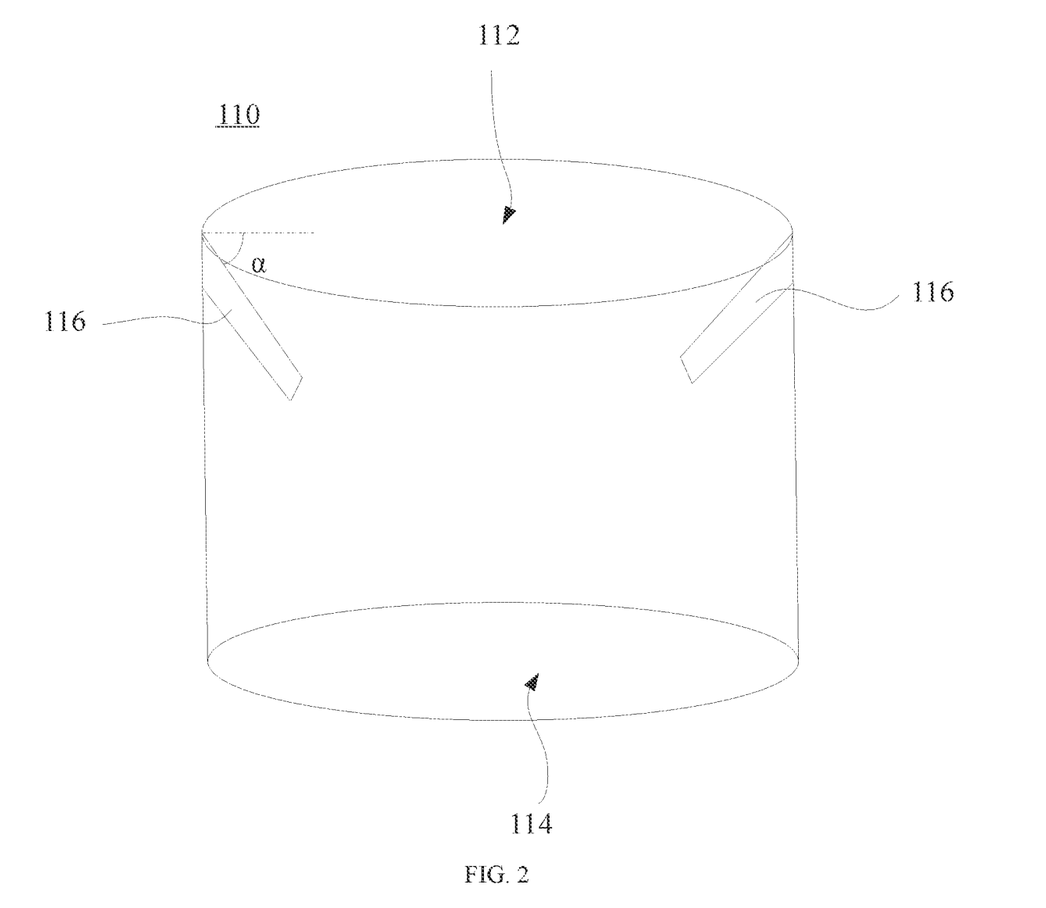
FIG. 2 is a structural schematic view of a nozzle cavity in the gas nozzle shown in FIG. 1.
Figure 3:
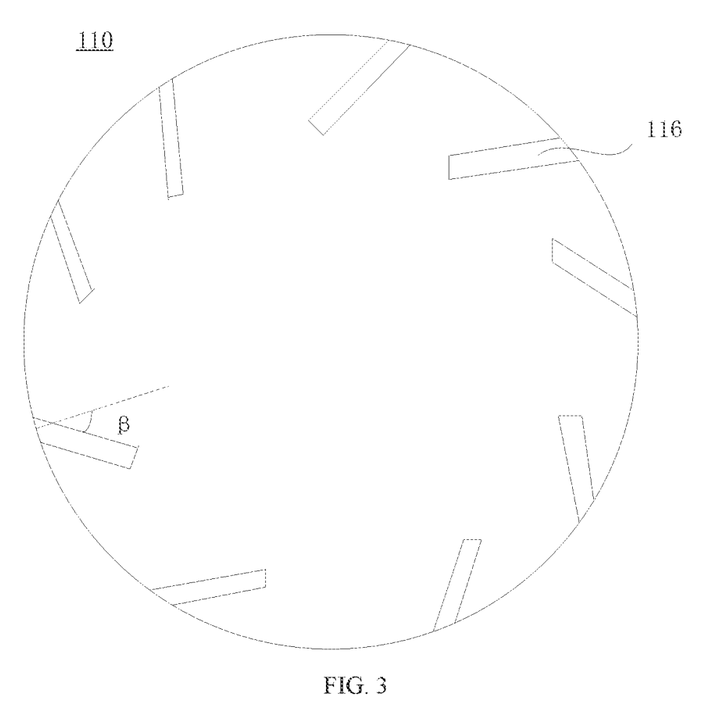
FIG. 3 is a top view of a nozzle cavity in the gas nozzle shown in FIG. 1.

Referring to FIG. 1 to FIG. 3, a gas nozzle 100 according to an embodiment of the present disclosure includes a nozzle cavity 110, and both ends of the nozzle cavity 110 are provided with a nozzle inlet 112 and a nozzle outlet 114, respectively. A mixed gas of a raw material gas and a fuel gas may be introduced into the nozzle cavity 110 through the nozzle inlet 112 to form a flame, to spray out the nozzle cavity 110 through the nozzle outlet 114.

A plurality of fuel gas channels 116 are provided on a side wall of the nozzle cavity 110. The plurality of fuel gas channels 116 are arranged around the side wall of the nozzle cavity 110. The plurality of fuel gas channels 116 are located between the nozzle inlet 112 and the nozzle outlet 114. In this way, the mixed gas introduced from the nozzle inlet 112 is surrounded by the fuel gas 21 introduced from the plurality of fuel gas channels 116.

Each of the fuel gas channels 116 is inclined towards the nozzle outlet 114, and each of the fuel gas channels 116 is further inclined in the same clockwise direction. In this way, the fuel gas introduced from the plurality of fuel gas channels 116 forms a downwardly conical spiral flame 22, and a flame formed by the mixed gas introduced from the nozzle inlet 112 is wrapped therein and sprayed out from the nozzle outlet 114. As such, on the one hand, it can be ensured that the temperature of the mixed gas entering the combustion zone is high enough to proceed the reaction. On the other hand, the fuel gas and the raw material gas can be further mixed to ensure sufficient reaction.

Taking hydrolysis reaction of silicon tetrafluoride to produce silica and hydrogen fluoride as an example, the raw material gas silicon tetrafluoride may be a by-product from phosphorus chemical industry, molybdenum ore tailings and silicon tetrafluoride obtained by other means. The comprehensive utilization of silicon tetrafluoride by-product of phosphorus chemical industry and molybdenum ore tailings can be realized so as to make full use of fluorine resources and silicon resources, turning waste into treasure. Thus, the problem of recycling of by-products of phosphorus chemical industry and molybdenum ore tailings can be solved.

The fuel gas may be hydrogen and oxygen, or hydrogen and air. The water produced by the reaction of hydrogen and oxygen can react with silicon tetrafluoride. At the same time, the reaction of hydrogen and oxygen releases a large amount of heat to provide a temperature field for the reaction of silicon tetrafluoride. In order to ensure the recycling of fluorine resources, the combustion gas is preferably hydrogen with a purity of greater than 99.0% and oxygen with a purity of greater than 99.0% so as to reduce the production of by-products such as carbon dioxide. Under the permitted condition of gas separation of the tail gas treatment system, combustible gases that can be burned to produce water, for example, low-boiling combustible gases, such as methyl ether, methane, and ethanol, can also be used.

In the specific embodiment shown in the drawings, the nozzle cavity 110 is a hollow barrel structure, specifically a cylindrical structure. Openings on both ends of the nozzle cavity 110 are the nozzle inlet 112 and the nozzle outlet 114, respectively.

As shown in FIGS. 2 and 3, in one embodiment, the fuel gas channels 116 are formed by arranging a plurality of intake pipes on the side wall of the nozzle cavity 110.

In one embodiment, a plurality of fuel gas channels 116 are equally distributed. In one embodiment, the plurality of fuel gas channels 116 are distributed symmetrically with the center axis of the nozzle cavity 110 as the center.

Optionally, the fuel gas channels 116 may be selected according to the size of the nozzle cavity 110. In one embodiment, four or more fuel gas channels 116 are provided. In a further embodiment, 5 to 20, such as 6, 8, 10, 15 fuel gas channels 116 are provided.

Optionally, the distance between the openings of two adjacent fuel gas channels 116 may be selected according to the size of the nozzle cavity 110. In one embodiment, the distance between the openings of two adjacent fuel gas channels 116 is 2 mm to 300 mm. In another embodiment, the distance between the openings of two adjacent fuel gas channels 116 is 5 mm to 200 mm. In yet another embodiment, the distance between the openings of two adjacent fuel gas channels 116 is 20 mm to 100 mm. In some specific embodiments, the distance between the openings of two adjacent fuel gas channels 116 is the same, such as 20 mm, 30 mm, 50 mm, 80 mm, etc.

As shown in FIG. 2, in one embodiment, each fuel gas channel 116 is inclined at an angle of 30° to 85° towards the nozzle outlet 114. For example, in an embodiment where the nozzle cavity 110 is a hollow cylindrical structure, the angle between each fuel gas channel 116 and the cross section of the nozzle cavity 110 is 30° to 85°.

In another embodiment, each fuel gas channel 116 is inclined at an angle of 40° to 75° towards the nozzle outlet 114.

In some specific embodiments, each fuel gas channel 116 is inclined at the same angle towards the nozzle outlet 114, such as 35°, 45°, 55°, 65°, 75°, etc.

In other embodiments, each fuel gas channel 116 may also be inclined at different angle α towards the nozzle outlet 114. For example, adjacent fuel gas channels 116 have different angle α, while two fuel gas channels 116 separated by a fixed number (e.g., 1 or 2, etc.) of fuel gas channels 116 have the same angle α. In this way, spiral flames with different tapers can be formed, the temperature of the reaction environment can be increased and the effect of gas mixing can be enhanced. In one specific embodiment, two fuel gas channels 116 separated by one fuel gas channel 116 have an angle α of 60°, and their adjacent fuel gas channel 116 has an angle α of 30°.

As shown in FIG. 3, in one embodiment, each fuel gas channels 116 is inclined at an angle β of 30° to 85° towards an adjacent fuel gas channel 116. For example, in an embodiment where the nozzle cavity 110 is a hollow cylindrical structure, the radial angle between the direction of the opening of each fuel gas channel 116 and the intersection of its reverse extension line on the nozzle cavity 110 is 30° to 85°.

In another embodiment, each fuel gas channels 116 is inclined at an angle β of 40° to 75° towards an adjacent fuel gas channel 116.

In some specific embodiments, each fuel gas channels 116 is inclined at the same angle β towards an adjacent fuel gas channel 116, such as 35°, 45°, 55°, 65°, 75°, etc.

In other embodiments, each fuel gas channel 116 may also be inclined at different angle β towards adjacent fuel gas channels 116. For example, adjacent fuel gas channels 116 have different angle β, while two fuel gas channels 116 separated by a fixed number (e.g., 1 or 2, etc.) of fuel gas channels 116 have the same angle β. In this way, spiral flames with different tapers can be formed, the temperature of the reaction environment can be increased and the effect of gas mixing can be enhanced. In one specific embodiment, two fuel gas channels 116 separated by one fuel gas channel 116 have an angle β of 60°, and its adjacent fuel gas channel 116 has an angle β of 30°.

As shown in FIG. 2, in one embodiment, each fuel gas channel 116 is provided on the side wall of one end of the nozzle cavity 110 close to the nozzle inlet 112. In other embodiments, the side wall of the nozzle cavity 110 may also be provided with multiple sets of fuel gas channels 116 from an end close to the nozzle inlet 112 to the other end close to the nozzle outlet 114, and each set of fuel gas channels 116 is arranged around the side wall of the nozzle cavity 110.

As shown in FIG. 1, in one embodiment, the gas nozzle 100 further includes a first jacket 120. The first jacket 120 is sleeved on the nozzle cavity 110. A first venting cavity 122 is formed between the first jacket and the nozzle cavity 110. A first jacket inlet 124 is provided on the first jacket. The first venting cavity 122 is in communication with the first jacket inlet 124 and the fuel gas channels 116.

In the specific embodiment shown in FIG. 1, two first jacket inlets 124 are provided, and the two first jacket inlets 124 are arranged opposite to each other. In this way, the fuel gas can be introduced from the two jacket inlets, respectively, and the fuel gas in the first venting cavity 122 enters the nozzle cavity 110 through each fuel gas channel 116. There is no need to introduce gas from each fuel gas channel 116 one by one, which is convenient to operate and can make each gas flow entering the nozzle cavity 110 uniform and stable.

As shown in FIG. 1, in one embodiment, the gas nozzle 100 further includes a mounting mechanism 130 that is configured to mount and connect the gas nozzle 100 to a mixed gas supply unit. For example, the mounting mechanism 130 may be provided with a flange 134 for sealing connection with the mixed gas supply unit.

The mounting mechanism 130 is connected to the nozzle cavity 110 and is provided with a mounting hole 132 that is in communication with the nozzle inlet 112 of the nozzle cavity 110. The mixed gas supply unit can extend into the mounting hole 132 to supply gas into the nozzle cavity 110.

In a further embodiment, an observation mirror 136 is provided on the mounting mechanism 130, and the observation mirror 136 is inclined and towards the inside of the nozzle cavity 110 for observing the flame condition in the nozzle cavity 110. In specific embodiments shown in the drawings, two observation mirrors 136 are provided on the mounting mechanism 130, and the two observation mirrors 136 are arranged opposite to each other to provide more observation angles. It can be understood that more observation mirrors 136, such as three or four, may be provided.

Figure 4:
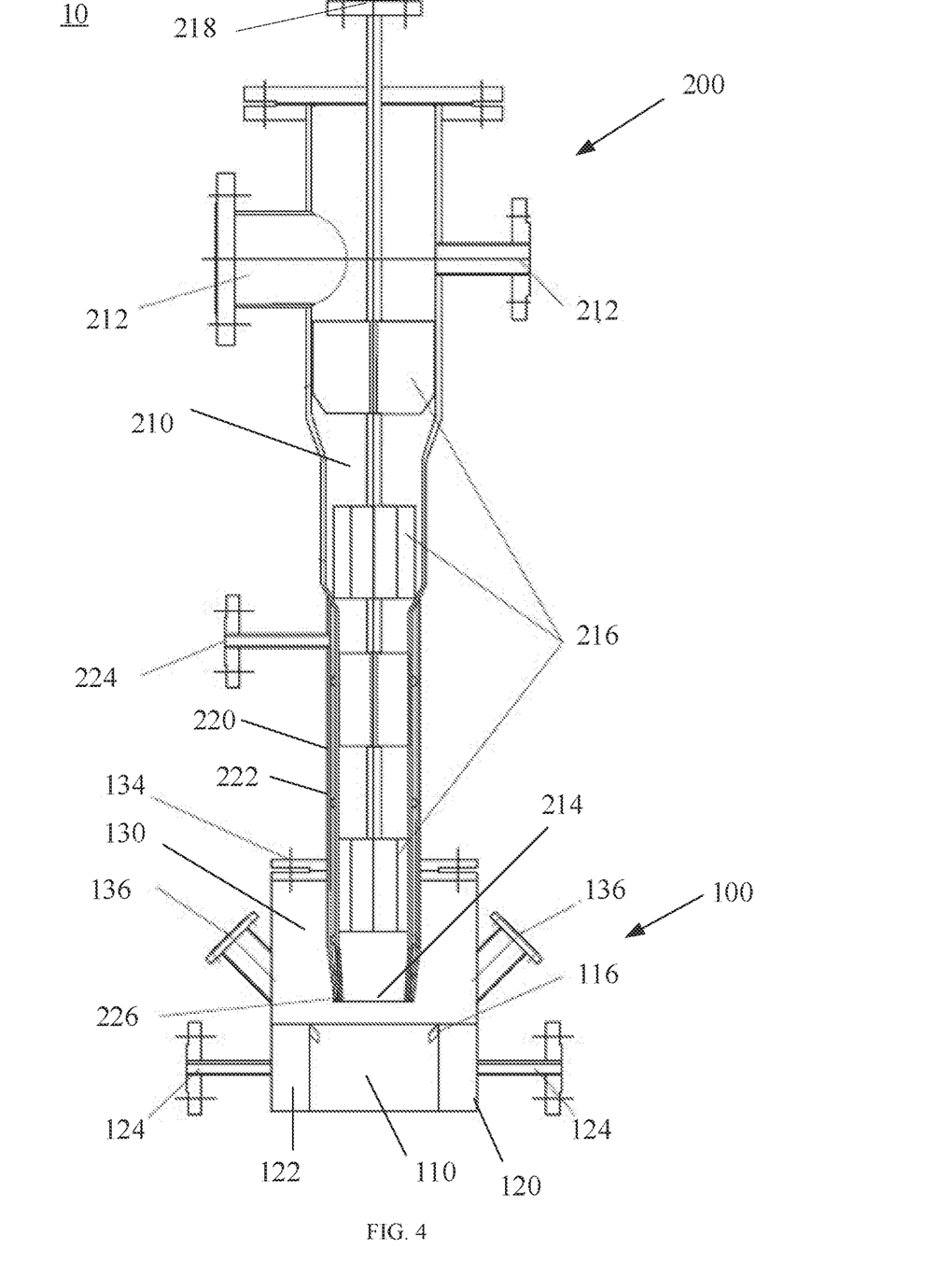
FIG. 4 is a schematic view of a part of the structure of a gas reaction device including the gas nozzle shown in FIG. 1.

As shown in FIG. 4, the present disclosure further provides a gas reaction device 10 including a gas supplier 200, a reaction chamber 300, and the gas nozzle 100 of any one of the above embodiments.

Wherein, the gas supplier 200 is in communication with the nozzle inlet 112 of the gas nozzle 100. The gas supplier 200 provides a gas source to the gas nozzle 100. The reaction chamber 300 is in communication with the nozzle outlet 114 of the gas nozzle 100. The reaction chamber 300 provides a space for gas reaction.

As shown in FIG. 4, in one embodiment, the gas supplier 200 includes a mixing cavity 210 and a second jacket 220.

Wherein, the mixing cavity 210 is provided with a mixing inlet 212 and a mixing outlet 214 that is in communication with the mixing inlet 212. The second jacket 220 is sleeved on the mixing cavity 210. A second venting cavity 222 is formed between the second jacket 220 and mixing cavity 210. The second jacket 220 is provided with a second jacket inlet 224 and a second jacket outlet 226 that are in communication with the second venting cavity 222. The second jacket outlet 226 is arranged around the mixing outlet 214. The second jacket outlet 226 and the mixing outlet 214 are each in communication with the nozzle inlet 112 of the nozzle cavity 110.

During the gas reaction, a raw material gas and a fuel gas may be introduced from the mixing inlet 212, mixed in the mixing cavity 210, and then pass through the mixing outlet 214 and are ignited to form a flame 211. At the same time, the fuel gas may be introduced from the second jacket inlet 224 to the second venting cavity 222, and passes through the second jacket outlet 226 and is ignited to form a flame 212. In this way, since the second jacket outlet 226 is arranged around the mixing outlet 214, the flame 212 wraps the flame 211 to form a flame 21 together. The flame 212 serves as a protective flame to provide a high temperature field for the reaction of the raw material gas, and at the same time, the spiral flame 22 formed in the nozzle cavity 110 wraps the flame 21 to further increase the temperature of the reaction, to form a temperature field of 1600° C. to 2500° C., which can fully ensure the success of the hydrolysis reaction of silicon tetrafluoride.

In the specific embodiment shown in FIG. 4, the mixing cavity 210 has two mixing inlets 212 arranged opposite to each other, through which the raw material gas and the fuel gas may be introduced, respectively.

As shown in FIG. 4, in one embodiment, the mixing cavity 210 is in a shape of a hollow tube, and multiple layers of gas dispersion plate 216 are provided in the mixing cavity 210. The gas dispersion plate 216 may be porous or divergent. The gas flow channel in the mixing cavity 210 is divided into multiple strands by each layer of gas dispersion plate 216. By providing the gas dispersion plate 216, the raw material gas and the fuel gas can be fully and uniformly mixed. In particular, the mixing effect of the raw material gas and the fuel gas can be further improved by arranging the gas dispersion plate 216 in layers. In the specific embodiment shown in the drawings, three layers of gas dispersion plates 216 are provided in the mixing cavity 210 from top to bottom.

As shown in FIG. 4, in one embodiment, the mixing cavity 210 is provided with a temperature detector 218. The temperature detector 218 can detect the temperature of the gas in the mixing cavity 210 in real time so as to know the temperature in the mixing cavity 210 in real time.

Figure 5:
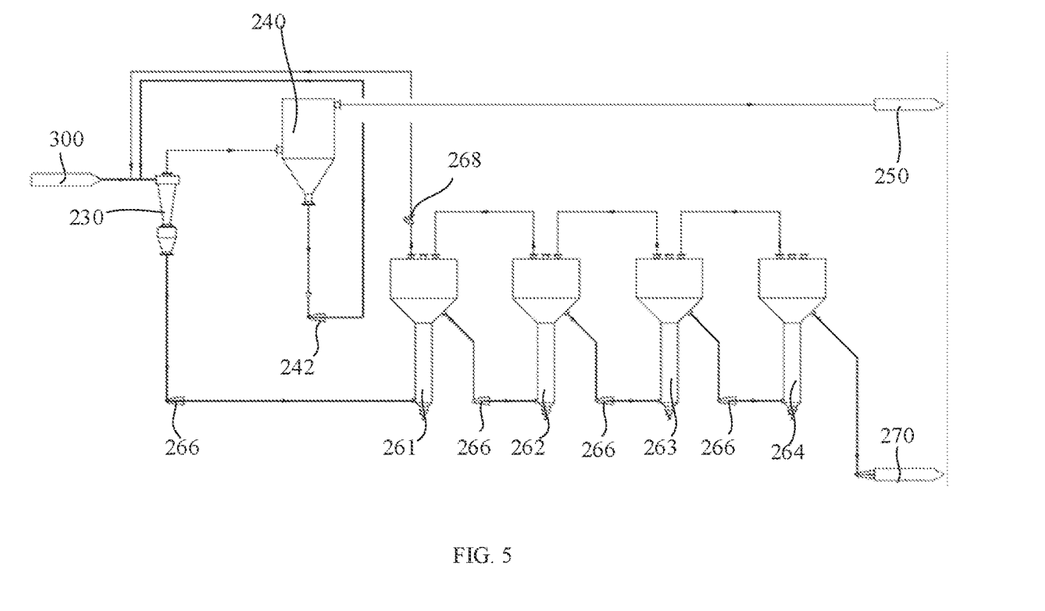
FIG. 5 is a schematic view of another part of the structure of the gas reaction device shown in FIG. 4.

As shown in FIG. 5, in one embodiment, the gas reaction device 10 further includes a gas-solid separator 230. The gas-solid separator 230 has a separation chamber, a separation feed port, a separation gas outlet and a separation solid outlet that are in communication with the separation chamber, and the separation feed port is in communication with a discharge port of the reaction chamber 300.

In this embodiment, the reaction product (gas-solid mixture) in the reaction chamber 300 is introduced into the separation chamber of the gas-solid separator 230 through the separation feed port for separation treatment of gas and solid. Generally, under high temperature conditions, the reaction between silicon tetrafluoride and water first generates silicic acid and hydrogen fluoride ($SiF_4 + H_2O \rightarrow H_2SiO_3 + HF$), while silicon tetrafluoride will further react with hydrogen fluoride ($SiF_4 + 2HF = H_2SiF_6$). The gas reaction device 10 of this embodiment separates the reaction product from the reaction chamber, especially the hydrogen fluoride gas is separated from the reaction chamber as soon as possible, which is beneficial to the continuation of the forward reaction, overcomes the influence of the reverse reaction, and improves the product yield.

Gases such as hydrogen fluoride obtained by gas-solid separation are discharged from the separation chamber through the separation gas outlet, and solids such as the obtained silica are discharged from the separation chamber through the separation solid outlet.

The gas-solid separator 230 may be but not limited to a cyclone separator, which has the advantages of higher efficiency and low cost, etc.

In one embodiment, an agglomerator is further provided between the gas-solid separator 230 and the reaction chamber 300, and the reaction products from the reaction chamber 300 are gathered and cooled by the agglomerator, and then introduced into the gas-solid separator 230 for gas-solid separation treatment, which can improve the utilization efficiency of the gas-solid separator 230.

As shown in FIG. 5, in one embodiment, the gas reaction device 10 further includes a bag duster 240. The bag duster 240 has a dedusting chamber, and a dedusting feed port, a dedusting gas outlet, and a dedusting solid outlet that are in communication with the dedusting chamber. The dedusting feed port is in communication with the separation gas outlet of the gas-solid separator 230, and the dedusting solid outlet is in communication with the separation feed port of the gas-solid separator 230.

A small amount of silica powder is entrained in the gas products (including the reaction product hydrogen fluoride) separated by the gas-solid separator 230, and the gas product enters the dedusting chamber from the separation gas outlet of the gas-solid separator 230 through the dedusting feed port of the bag duster 240 for dedusting treatment. After the powder in the gas is filtered and settled by the bag duster 240, it returns to the separation chamber of the gas-solid separator 230 from the dedusting solid outlet through the separation feed port of the gas-solid separator 230. In this way, a part of the silica product is prevented from being taken away by the tail gas, and the yield of silica is improved.

As shown in FIG. 5, the pipe connecting the dedusting solid outlet and the separation feed port of the gas-solid separator 230 is provided with a dedusting conveyor 242 for transporting the obtained powder back to the gas-solid separator 230.

The tail gas processed by the bag duster 240 is discharged from the dedusting chamber via the dedusting gas outlet.

As shown in FIG. 5, in one embodiment, the gas reaction device 10 further includes a tail gas processor 250, and the tail gas processor 250 is in communication with the dedusting gas outlet of the bag duster 240. The tail gas discharged from the bag duster 240 is introduced into the tail gas processor 250 for processing to avoid environmental pollution.

The tail gas processor 250 mainly separates dust and other gases in the reaction tail gas to obtain hydrogen fluoride gas or obtain hydrofluoric acid after absorption, so as to make full use of fluorine resources. After passing through the bag duster 240, the dust in the tail gas become very low. In the tail gas processor 250, the dust in the tail gas can be further separated by a settling tank, and then filtered through a filter to obtain a dust-free tail gas. Then the carbon dioxide and a small amount of silicon tetrafluoride in the tail gas are separated through a freeze dryer for process such as freeze drying, to obtain high-purity hydrogen fluoride gas, or to obtain hydrofluoric acid after absorption.

As shown in FIG. 5, in one embodiment, the gas reaction device 10 further includes a deacidification apparatus. The deacidification apparatus has a deacidification chamber, and a deacidification feed port, a deacidification gas outlet and a deacidification solid outlet that are in communication with the deacidification chamber, and the deacidification feed port is in communication with the separation solid outlet of the gas-solid separator 230. A deacidification apparatus sold on the market may be used as the deacidification apparatus.

After the reaction product is separated by the gas-solid separator 230, the solid silica product is still attached with hydrogen fluoride gas. In this embodiment, the silica product is introduced from the gas-solid separator 230 into the deacidification chamber for deacidification treatment through the deacidification feed port of the deacidification apparatus, removing gases such as hydrogen fluoride attached to the surface of the silica particles to improve the pH and purity of silica. As shown in FIG. 5, the pipe connecting the deacidification feed port and the separation solid outlet of the gas-solid separator 230 is provided with a deacidification conveyor 266 for transporting solid products to the deacidification apparatus.

The gas removed from the deacidification chamber passes through the deacidification gas outlet. In another embodiment, the deacidification gas outlet of the deacidification apparatus is in communication with the separation feed port of the gas-solid separator 230, and the gas removed from the deacidification chamber can return to the gas-solid separator 230. In this way, a small amount of silica powder in the gas returns to the gas-solid separator 230 for gas-solid separation to reduce product loss.

As shown in FIG. 5, the pipe connecting the deacidification gas outlet and the separation feed port of the gas-solid separator 230 is provided with a valve 268 for gas flow control.

As shown in FIG. 5, in one embodiment, the gas reaction device 10 is provided with a multi-stage deacidification apparatus. A deacidification feed port of a subsequent stage deacidification apparatus is in communication with a deacidification solid outlet of a previous stage deacidification apparatus, and a deacidification feed port of a first-stage deacidification apparatus 261 is in communication with the separation solid outlet of the gas-solid separator 230. In this way, the pH and purity of the silica product can be gradually improved.

As shown in FIG. 5, the pipe connecting the deacidification feed port of the subsequent stage deacidification apparatus and the deacidification solid outlet of the previous stage deacidification apparatus is provided with a deacidification conveyor 266.

In another embodiment, the deacidification apparatus is further provided with a deacidification gas inlet that is in communication with the deacidification chamber. A deacidification gas outlet of the subsequent stage deacidification apparatus is in communication with a deacidification gas inlet of the previous stage deacidification apparatus, and a deacidification gas outlet of the first-stage deacidification apparatus 261 is in communication with the separation feed port of the gas-solid separator 230. In the specific embodiment shown in the drawings, the gas reaction device 10 is provided with a four-stage deacidification apparatus. The powder from the first-stage deacidification apparatus 261 enters the second-stage deacidification apparatus 262, and the tail gas returns to the gas-solid separator 230. The powder after deacidification through the second-stage deacidification apparatus 262 enters the third-stage deacidification apparatus 263, and the tail gas returns to the first-stage deacidification apparatus 261, the powder after deacidification through the third-stage deacidification apparatus 263 enters the fourth stage deacidification apparatus 264, and the tail gas returns to the second-stage deacidification apparatus 262, thus a total of four-stage deacidification treatment is carried out accordingly. The powder after four-stage deacidification enters a silo 270.

The gas removed from the deacidification chamber then returns to the previous stage deacidification apparatus due to it still entrains part of the powder. After circulating deacidification and filtration, the hydrogen fluoride gas adsorbed on the surface of the silica can be fully removed. After four-stage deacidification treatment, the silica powder has a yield of more than 99%. Through this multi-stage series deacidification apparatus, the negative micro-pressure inside the deacidification apparatus can be ensured, which is beneficial to the removal of gases such as hydrogen fluoride adsorbed on the surface of the silica. The efficient flow of the powder in the deacidification apparatus is also ensured, the deacidification efficiency and production efficiency are improved, and the final product has a pH value higher than 3.8.

The gas reaction device 10 according to the specific embodiment shown in FIG. 5, through effective separation and desorption processes, the drawback that the silica obtained by a conventional method contains too much fluorosilicic acid and hydrogen fluoride is overcome, the application versatility of silica is greatly improved, and high-purity hydrogen fluoride is obtained at the same time. Fluorine resources are thus also fully utilized.

In a further embodiment, the present disclosure also provides a method for performing gas hydrolysis reaction using the gas reaction device 10 of any one of the above embodiments, and the method includes the following steps:

introducing a mixed gas of a raw material gas and a fuel gas into the nozzle cavity 110 through the gas supplier 200 and igniting the mixed gas to form a first flame; and introducing a fuel gas into the nozzle cavity 110 through the fuel gas channel 116 and igniting the fuel gas to form a second flame surrounding the first flame.

Taking the preparation of silicon dioxide and hydrogen fluoride by the hydrolysis reaction of silicon tetrafluoride as an example, the present disclosure will be further illustrated in conjunction with a gas reaction device 10 according to a specific embodiment.

Referring to FIG. 4 and FIG. 5, the process of a method for gas hydrolysis reaction according to a specific embodiment is described as follows:

The raw material gas silicon tetrafluoride used in this embodiment may be a by-product from phosphorus chemical industry, molybdenum ore tailings and silicon tetrafluoride obtained by other means. The fuel gas may be hydrogen and oxygen, or hydrogen and air, or may be a combustible gas that can be burned to produce water, for example, a low-boiling combustible gas such as methyl ether, methane, ethanol, etc., preferably, hydrogen with a purity greater than 99.0% and oxygen with a purity greater than 99.0%, reducing the production of by-products such as carbon dioxide.

The raw material gas and the fuel gas are introduced from the two mixing inlets 212 of the mixing cavity 210, respectively. The raw material gas and the fuel gas form a uniform mixed gas under the mixing action of the three-layer gas dispersion plate 216 in the mixing cavity 210. The mixed gas discharges from the mixing outlet 214 of the mixing cavity 210 and is ignited to form a flame 211. At the same time, the fuel gas is introduced from the second jacket inlet 224 of the second jacket 220 to the second venting cavity 222, and the fuel gas discharges from the second jacket outlet 226 and is ignited to form a flame 212. The flame 212 wraps the flame 211 to form a flame 21 together, and the flame 212 serves as a protective flame to provide a high temperature field for the reaction of the raw material gas.

A fuel gas is introduced from two first jacket inlets 124 of the first jacket 120 with a certain introduction speed, so that the fuel gas is injected into the nozzle cavity 110 at a certain speed through a plurality of fuel gas channels 116 and is ignited to form a downwardly conical spiral flame 22. The downwardly conical spiral flame 22 wraps the flame 21 formed from the mixed gas introduced from the nozzle inlet 112, to form a temperature field of 1600° C. to 2500° C., so as to proceed the hydrolysis reaction. The flame is sprayed into the reaction chamber 300 to perform a hydrolysis reaction to generate crude silica and hydrogen fluoride products.

After the crude product is gathered and cooled by the agglomerator, it is transported to the gas-solid separator 230 (cyclone separator) through the pipe for gas-solid separation treatment. The gas products separated by the gas-solid separator 230 enters the dedusting chamber from the separation gas outlet of the gas-solid separator 230 through the dedusting feed port of the bag duster 240 for dedusting treatment. After the powder in the gas is filtered and settled by the bag duster 240, it returns to the separation chamber of the gas-solid separator 230 from the dedusting solid outlet through the separation feed port of the gas-solid separator 230. The tail gas processed by the bag duster 240 is introduced into the tail gas processor 250 for processing. After passing through the bag duster 240, the dust in the tail gas become very low. In the tail gas processor 250, the dust in the tail gas can be further separated by a settling tank, and then filtered through a filter to obtain a dust-free tail gas. Then the carbon dioxide and a small amount of silicon tetrafluoride in the tail gas are separated through a freeze dryer for process such as freeze drying, to obtain high-purity hydrogen fluoride gas, or obtain hydrofluoric acid after absorption, so as to make full use of fluorine resources.

The silica product separated by the gas-solid separator 230 is subjected to a deacidification treatment by a four-stage deacidification device to remove gases such as hydrogen fluoride attached to the surface of the silica particles. The powder from the first-stage deacidification apparatus 261 enters the second-stage deacidification apparatus 262, and the tail gas returns to the gas-solid separator 230. The powder after deacidification through the second-stage deacidification apparatus 262 enters the third-stage deacidification furnace, and the tail gas returns to the first-stage deacidification apparatus 261, thus a total of four-stage deacidification treatment is carried out accordingly. The gas removed from the deacidification chamber returns to the previous stage deacidification apparatus, and the removed gas from the first stage deacidification apparatus 261 is transported back to the gas-solid separator 230 through the pipe. Finally, the silica product from the fourth-stage deacidification apparatus 264 has a yield of higher than 99% and a pH value of higher than 3.8.

It can be understood that the above-mentioned gas nozzle 100, gas reaction device 10, and method for gas hydrolysis reaction are not only applicable to the hydrolysis reaction of silicon tetrafluoride, but also to other gas reactions that require high temperature conditions.

According to the above-mentioned gas nozzle 100, gas reaction device 10 and method for gas hydrolysis reaction, the plurality of fuel gas channels 116 are provided on the side wall of the nozzle cavity 110, the plurality of fuel gas channels 116 are arranged around the side wall of the nozzle cavity 110, and the mixed gas introduced from the nozzle inlet 112 is surrounded by the fuel gas introduced from the plurality of fuel gas channels 116. Each fuel gas channels 116 is inclined towards the nozzle outlet 114 and is further inclined in the same clockwise direction. In this way, the fuel gas introduced from the plurality of fuel gas channels 116 forms a downwardly conical spiral flame, which wraps the flame formed by the mixed gas introduced from the nozzle inlet 112 to spray out from the nozzle outlet 114. As such, on the one hand, it can be ensured that the temperature of the mixed gas entering the combustion zone is high enough to proceed the reaction. On the other hand, the fuel gas and the raw material gas can be further mixed to ensure sufficient reaction.

Each of the technical features of the above-mentioned embodiments may be combined arbitrarily. To simplify the description, not all the possible combinations of each of the technical features in the above embodiments are described. However, all of the combinations of these technical features should be considered as within the scope of this disclosure, as long as such combinations do not contradict with each other.

The above-mentioned embodiments are merely illustrative of several embodiments of the present disclosure, which are described specifically and in detail, but it cannot be understood to limit the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

What is claimed is:

1. A gas nozzle, comprising:
   a nozzle cavity, both ends of the nozzle cavity being provided with a nozzle inlet and a nozzle outlet, respectively;
   a plurality of fuel gas channels being provided on a side wall of the nozzle cavity, the plurality of fuel gas channels being arranged around the side wall of the nozzle cavity, each of the plurality of fuel gas channels being inclined towards the nozzle outlet and in a same clockwise direction; and
   a first jacket sleeved on the nozzle cavity, a first venting cavity being formed between the first jacket and the nozzle cavity, each of the plurality of fuel gas channels in communication with the first venting cavity, and the first jacket provided with a first jacket inlet that is in communication with the first venting cavity.

2. The gas nozzle according to claim 1, wherein
the nozzle cavity is a hollow barrel structure, and openings on the both ends of the nozzle cavity are the nozzle inlet and the nozzle outlet, respectively; and/or
the plurality of fuel gas channels are equally distributed; and/or
the plurality of fuel gas channels has four or more of the fuel gas channels; and/or
a distance between openings of two adjacent fuel gas channels of the plurality of fuel gas channels is 2 mm to 300 mm.

3. The gas nozzle according to claim 1, wherein
each of the fuel gas channels in the plurality of fuel gas channels is inclined at an angle of 30° to 85° towards the nozzle outlet; and/or
each of the fuel gas channels in the plurality of fuel gas channels is inclined at an angle of 30° to 85° towards an adjacent fuel gas channel in the plurality of fuel gas channels.

4. A gas reaction device, comprising:
a gas supplier;
a reaction chamber; and
the gas nozzle according to claim 1, wherein the gas supplier is in communication with the nozzle inlet of the gas nozzle, and the reaction chamber is in communication with the nozzle outlet of the gas nozzle.

5. The gas reaction device according to claim 4, wherein the gas supplier comprises a mixing cavity and a second jacket, the mixing cavity is provided with a mixing inlet and a mixing outlet that is in communication with the mixing inlet, the second jacket is sleeved on the mixing cavity, a second venting cavity is formed between the second jacket and the mixing cavity, and the second jacket is provided with a second jacket inlet and a second jacket outlet that are in communication with the second venting cavity, the second jacket outlet is arranged around the mixing outlet, and the second jacket outlet and the mixing outlet are each in communication with the nozzle inlet of the nozzle cavity.

6. The gas reaction device according to claim 4, further comprising a gas-solid separator that has a separation chamber, and a separation feed port, a separation gas outlet and a separation solid outlet that are in communication with the separation chamber, and the separation feed port is in communication with a discharge port of the reaction chamber.

7. The gas reaction device according to claim 6, further comprising a bag duster that has a dedusting chamber, and a dedusting feed port, a dedusting gas outlet, and a dedusting solid outlet that are in communication with the dedusting chamber, the dedusting feed port is in communication with the separation gas outlet of the gas-solid separator, and the dedusting solid outlet is in communication with the separation feed port of the gas-solid separator.

8. The gas reaction device according to claim 6, further comprising a deacidification apparatus that has a deacidification chamber and a deacidification feed port, a deacidification gas outlet and a deacidification solid outlet that are in communication with the deacidification chamber, and the deacidification feed port is in communication with the separation solid outlet of the gas-solid separator.

9. The gas reaction device according to claim 8, wherein the deacidification apparatus has multiple stages, a deacidification feed port of a subsequent stage deacidification apparatus is in communication with a deacidification solid outlet of a previous stage deacidification apparatus, and a deacidification feed port of a first-stage deacidification apparatus is in communication with the separation solid outlet of the gas-solid separator.

10. The gas reaction device according to claim 9, wherein the deacidification apparatus is further provided with a deacidification gas inlet that is communication with the deacidification chamber, a deacidification gas outlet of the subsequent stage deacidification apparatus is in communication with a deacidification gas inlet of the previous stage deacidification apparatus, and a deacidification gas outlet of the first-stage deacidification apparatus is in communication with the separation feed port of the gas-solid separator.

11. A method for gas hydrolysis reaction using the gas reaction device according to claim 4, the method comprising:
introducing a mixed gas of a raw material gas and a fuel gas into the nozzle cavity through the gas supplier and igniting the mixed gas to form a first flame; and
introducing a fuel gas into the nozzle cavity through the plurality of fuel gas channels and igniting the fuel gas to form a second flame surrounding the first flame.

12. The method for gas hydrolysis reaction according to claim 11, wherein the raw material gas comprises silicon tetrafluoride, and the fuel gas produces water by combustion.

* * * * *